(12) United States Patent
Francis et al.

(10) Patent No.: US 7,807,240 B2
(45) Date of Patent: Oct. 5, 2010

(54) OPAQUE POLYESTER FILM AS SUBSTRATE WITH WHITE COATINGS ON BOTH SIDES

(75) Inventors: John Francis, Cleveland (GB); Philip Mark Rutter, Cleveland (GB)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 821 days.

(21) Appl. No.: 11/513,884

(22) Filed: Aug. 31, 2006

(65) Prior Publication Data

US 2007/0054141 A1 Mar. 8, 2007

Related U.S. Application Data

(63) Continuation of application No. 10/265,891, filed on Oct. 7, 2002, now abandoned, which is a continuation of application No. 09/242,247, filed on Feb. 14, 2000, now abandoned.

(30) Foreign Application Priority Data

Aug. 14, 1996 (EP) .................................. 96305953
Aug. 12, 1997 (WO) ..................... PCT/GB97/02164

(51) Int. Cl.
*B32B 27/10* (2006.01)
(52) U.S. Cl. ................. 428/32.24; 428/32.1; 428/32.13; 428/32.14; 428/195.1
(58) Field of Classification Search ................. 428/195, 428/32.14, 32.1, 32.13, 32.24
See application file for complete search history.

(56) References Cited

U.S. PATENT DOCUMENTS

| | | | | |
|---|---|---|---|---|
| 3,933,875 | A | 1/1976 | Brose et al. | |
| 4,301,239 | A * | 11/1981 | Miller | 430/510 |
| 4,603,073 | A * | 7/1986 | Renalls et al. | 428/147 |
| 4,614,681 | A * | 9/1986 | Hayashi et al. | 428/201 |
| 4,741,950 | A * | 5/1988 | Liu et al. | 428/315.5 |
| 5,171,625 | A * | 12/1992 | Newton | 428/195 |
| 5,268,416 | A | 12/1993 | Traubel et al. | |
| 5,474,843 | A * | 12/1995 | Lambert et al. | 428/32.24 |
| 5,496,791 | A | 3/1996 | Ohno et al. | |
| 5,547,822 | A * | 8/1996 | Noda et al. | 430/531 |
| 5,607,896 | A | 3/1997 | Hutt | |
| 5,686,504 | A | 11/1997 | Ang | |
| 5,714,305 | A | 2/1998 | Teng et al. | |
| 5,733,845 | A * | 3/1998 | Brust et al. | 503/227 |
| 5,846,620 | A * | 12/1998 | Compton | 428/35.7 |
| 6,017,993 | A * | 1/2000 | Maeda et al. | 524/497 |
| 6,025,300 | A * | 2/2000 | Muto et al. | 503/227 |
| 6,096,410 | A | 8/2000 | Okajima et al. | |
| 6,270,888 | B1 * | 8/2001 | Rutter et al. | 428/347 |
| 6,365,319 | B1 * | 4/2002 | Heath et al. | 430/138 |

(Continued)

FOREIGN PATENT DOCUMENTS

JP 63-220421 9/1988

(Continued)

*Primary Examiner*—Mark Ruthkosky
*Assistant Examiner*—Tamra L Amakwe
(74) *Attorney, Agent, or Firm*—RatnerPrestia

(57) ABSTRACT

A multilayer white polymeric film having a core layer with an optical transmission density greater than 2.0, a white polyester outer layer on either side of the core layer and an ink receptive layer on the outer surface of the white polyester layers.

18 Claims, 1 Drawing Sheet

U.S. PATENT DOCUMENTS

| | | | |
|---|---|---|---|
| 6,436,219 B1 * | 8/2002 | Francis et al. | 156/244.11 |
| 6,521,351 B2 * | 2/2003 | Murschall et al. | 428/480 |
| 6,864,023 B2 * | 3/2005 | Aylward et al. | 430/15 |
| 6,939,600 B2 * | 9/2005 | Murschall et al. | 428/212 |
| 7,044,396 B2 * | 5/2006 | Sankey et al. | 235/494 |
| 2003/0108730 A1 * | 6/2003 | Francis et al. | 428/212 |

FOREIGN PATENT DOCUMENTS

| | | | |
|---|---|---|---|
| JP | 06-234868 | * | 8/1994 |
| JP | 6-234868 | | 8/1994 |
| JP | 07-505548 | | 6/1995 |
| JP | 07-239530 | | 9/1995 |
| JP | 07-304244 | | 11/1995 |
| JP | 07-314884 | | 12/1995 |
| JP | 08-036746 | | 2/1996 |
| WO | WO9807068 | * | 2/1998 |

* cited by examiner

OPAQUE POLYESTER FILM AS SUBSTRATE WITH WHITE COATINGS ON BOTH SIDES

This application is a continuation application of application Ser. No. 10/265,891, filed Oct. 7, 2002 now abandoned which is a continuation application of Ser. No. 09/242,247 filed Feb. 14, 2000 now abandoned claiming priority of PCT/GB97/02164 filed Aug. 12, 1997 which claims priority of Aug. 14, 1996 EP 96305953.0.

This invention relates to a polyester film, and in particular to a white polyester film which is suitable for imaging.

Polyester film has been used in a wide range of imaging applications. White polyester film has been used, in some cases as an alternative to paper, for the application of photographic images, for writing on, in printing applications such as thermal and laser transfer printing, inkjet printing, photocopying etc. Unfortunately, existing white polyester films are of relatively low opacity such that some light can pass through the film and interfere with the viewing of any image applied thereon. This can be a particular problem when imaging of both sides of the white polyester film is required, ie an image applied to one side of the film can frequently be seen through the other side of the film. Thus, known white polyester films do not have the opacity required to enable images to be applied to both sides of the film without one image interfering with the other. The opacity of a film can be increased by increasing the concentration of the whitening or opacifying agent, ie filler, present in the film, or by increasing the thickness of the film. However, there are practical limits on how much filler can be incorporated into a film, and increasing film thickness will correspondingly increase the cost of the film and may make it unsuitable for the particular intended application.

Another problem associated with imaging both sides of white polyester film is that the two surfaces of existing white films are different, eg can have significantly different surface roughness, whiteness and/or gloss values, which can be aesthetically displeasing to the final consumer, as the same image applied to the two surfaces of a film can have a different appearance.

We have now devised a polyester film which reduces or overcomes at least one of the aforementioned problems.

Accordingly, the present invention provides a polyester film comprising an opaque core layer having an optical density greater than 2.0, having on both surfaces thereof, a white outer layer.

The invention also provides a method of producing a polyester film which comprises forming an opaque core layer having an optical density greater than 2.0, and applying on both surfaces thereof, a white outer layer.

The core layer and/or white outer layers of a polyester film according to the invention may be formed from any film-forming, polyester material. Suitable thermoplastics polyester materials include a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxy-ethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838,708.

In a preferred embodiment of the invention the core layer and white outer layers of the polyester film comprise the same polyester material, more preferably polyethylene terephthalate or polyethylene naphthalate, and particularly polyethylene terephthalate. It is also preferred that the core layer and/or white outer layers comprise crystalline and/or semi-crystalline polyester material.

The opaque core layer and/or white outer layers of a polyester film according to the invention may be uniaxially oriented, but are preferably biaxially oriented by drawing in two mutually perpendicular directions in the plane of the film to achieve a satisfactory combination of mechanical and physical properties. Formation of the film may be effected by any process known in the art for producing an oriented polyester, film, for example a tubular or flat film process.

In a tubular process simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process a film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, ie the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the film-forming polyester, for example polyethylene terephthalate is usually stretched so that the dimension of the oriented film is from 2 to 5, more preferably 2.5 to 4.5 times its original dimension in the, or each direction of stretching.

A stretched film may be, and preferably is, dimensionally stabilised by heat-setting under dimensional restraint at a temperature above the glass transition temperature of the film-forming polyester but below the melting temperature thereof, to induce crystallisation of the polyester.

Formation of a polyester film according to the invention may be effected by conventional techniques, for example by laminating together a preformed opaque core layer, and preformed white outer layers, or by casting the white outer layers onto a preformed opaque core layer, or vice versa. Conveniently, however, formation of a composite polyester film according to the present invention is effected by coextrusion, of the three layers (outer/core/outer), either by simultaneous coextrusion of the respective film-forming layers through independent orifices of a multi-orifice die, and thereafter uniting the still molten layers, or, preferably, by single-channel coextrusion in which molten streams of the respective polyesters are first united within a channel leading to a die manifold, and thereafter extruded together from the die orifice under conditions of streamline flow without intermixing thereby to produce a multilayer film.

The core layer is opaque, by which is meant exhibits a Transmission Optical Density (TOD), measured as described herein, of greater than 2.0, preferably in the range from 2.5 to 10, more preferably 3.0 to 7.0, particularly 4.0 to 6.0, and especially 4.5 to 5.5. The aforementioned TOD ranges are particularly applicable to a 60 µm thick core layer. The core layer is conveniently rendered opaque by the incorporation therein of an effective amount of an opacifying agent, such as carbon black, or a metallic filler such as aluminium powder. Carbon black is a particularly preferred opacifying agent, especially carbon black known as Furnace type carbon black.

The opaque core layer preferably comprises in the range from 0.05% to 10%, more preferably 0.1% to 5%, particularly 0.2% to 4%, and especially 0.3% to 1% of opacifying agent, by weight based on the weight of the core layer polyester. The opacifying agent, preferably of carbon black, suitably has a mean particle diameter in the range from 0.005 to 10 µm, more preferably 0.01 to 1.5 µm, especially 0.015 to 0.1 µm, and particularly 0.02 to 0.05 µm.

The opacifying agent preferably has a BET surface area, measured as described herein, in the range from 20 to 300, more preferably 50 to 200, and particularly 110 to 160 $m^2 gm^{-1}$.

The opaque core layer is suitably grey or black, and preferably exhibits a CIE laboratory colour co-ordinate L* value, measured as herein described, in the range from 10 to 60, more preferably 15 to 50, particularly 20 to 40, and especially 25 to 35.

In a preferred embodiment of the invention, the opaque core layer additionally comprises at least one whitening agent, as described below. It is particularly preferred that the opaque core layer comprises the same whitening agent(s) present in the white outer layers, ie the opaque core and white outer layers comprise at least one common whitening agent. The opaque core layer suitably comprises in the range from 5% to 99%, preferably 25% to 97%, more preferably 60% to 95%, particularly 70% to 90%, and especially 75% to 85% by weight of whitening agent, relative to the weight of whitening agent present in the white outer layers.

The thickness of the opaque core layer is preferably in the range from 0.5 to 150 µm, more preferably 5 to 100 µm, particularly 30 to 80 µm, and especially 50 to 70 µm.

The white outer layers preferably exhibit a Transmission Optical Density (TOD) in the range from 0.4 to 1.75, more preferably 0.5 to 1.2, especially 0.6 to 1.0, and particularly 0.7 to 0.9. The aforementioned TOD ranges are particularly applicable to a 45 µm thick outer layer. The outer layers are conveniently rendered white by incorporation therein of an effective amount of a whitening agent. Suitable whitening agents include a particulate inorganic filler, an incompatible resin filler, or a mixture of two or more such fillers.

Particulate inorganic fillers suitable for generating a white outer layer include conventional inorganic pigments and fillers, and particularly metal or metalloid oxides, such as alumina, silica and titania, and alkaline metal salts, such as the carbonates and sulphates of calcium and barium. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the outer layer polyester.

Suitable particulate inorganic fillers may be of the non-voiding or voiding type, ie by voiding is meant comprises a cellular structure containing at least a proportion of discrete, closed cells. Barium sulphate is an example of a filler which results in the formation of voids. Titanium dioxide may be of the voiding or non-voiding type, dependant upon the particular type of titanium dioxide employed. In a preferred embodiment of the invention, the white outer layers comprise titanium dioxide or barium sulphate, or a mixture thereof.

The amount of inorganic filler incorporated into the white outer layers desirably should be not less than 1% nor exceed 50% by weight, based on the weight of the outer layer polyester. Particularly satisfactory levels of whiteness are achieved when the concentration of filler is preferably in the range from 5% to 30%, more preferably 15% to 25%, and particularly 18% to 22% by weight, based on the weight of the outer layer polyester. In one embodiment of the invention, the outer layers comprise a mixture of titanium dioxide and barium sulphate particles, preferably present in a weight ratio in the range from 3 to 0.4:1, more preferably 2 to 0.8:1, and particularly 1.5 to 1:1.

The titanium dioxide filler particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as using the chloride process, or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

The individual or primary titanium dioxide particles suitably have a mean crystal size, as determined by electron microscopy, in the range from 0.05 to 0.4 µm, preferably 0.1 to 0.3 µm, and more preferably 0.2 to 0.25 µm. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polyester and/or polyester film making process.

The inorganic filler, suitably aggregated titanium dioxide and/or barium sulphate, preferably has a volume distributed median particle diameter (equivalent spherical diameter corresponding to 50% of the volume of all the particles, read on the cumulative distribution curve relating volume % to the diameter of the particles—often referred to as the "D(v,0.5)" value) in the range from 0.1 to 1.5 µm, more preferably 0.2 to 1.2 µm, particularly 0.4 to 1.0 µm, and especially 0.6 to 0.9 µm.

It is preferred that none of the filler particles incorporated into the outer layers according to this invention should have an actual particle size exceeding 20 µm. Particles exceeding such a size may be removed by sieving processes which are known in the art. However, sieving operations are not always totally successful in eliminating all particles greater than a chosen size. In practice, therefore, the size of 99.9% by number of the particles should not exceed 20 μm. Most preferably the size of 99.9% of the particles should not exceed 10 μm. Preferably at least 90%, more preferably at least 95% of the filler particles, are within the range of the volume distributed median particle diameter ±0.5 μm, and particularly ±0.3 μm.

Particle size of the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

By an "incompatible resin" is meant a resin which either does not melt, or which is substantially immiscible with the polyester, at the highest temperature encountered during extrusion and fabrication of the white outer layers. Such resins include polyamides and olefin polymers, particularly a homo- or co-polymer of a mono-alpha-olefin containing up to 6 carbon atoms in its molecule, for incorporation into polyester films. Preferred materials, particularly for incorporation into polyethylene terephthalate outer layers, include an olefin polymer, such as a low or high density homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Dispersibility of the aforementioned olefin polymer in a white outer layer may be inadequate to confer the desired characteristics. Preferably, therefore a dispersing agent is incorporated together with the olefin polymer softening agent. The dispersing agent conveniently comprises a carboxylated polyolefin, particularly a carboxylated polyethylene. Suitable carboxylated polyolefins include those having a Brookfield Viscosity (140° C.) in the range 150-100000 cps (preferably 150-50000 cps) and an Acid Number in the range 5-200 mg KOH/g (preferably 5-50 mg KOH/g), the Acid Number being the number of mg of KOH required to neutralise 1 g of polymer.

The amount of dispersing agent may be selected to provide the required degree of dispersibility, but conveniently is in the range from 0.05% to 50%, preferably 0.5% to 20% by weight, based on the weight of the olefin polymer.

The amount of incompatible resin filler present in the white outer layers is preferably within the range from 2% to 30%, more preferably 3% to 20%, particularly 4% to 15%, and especially 5% to 10% by weight, based on the weight of the outer layer polyester.

In one embodiment of the invention, the white outer layers comprise an optical brightener. An optical brightener may be included at any stage of the polyester or polyester film production. Preferably the optical brightener is added to the glycol, or alternatively by subsequent addition to the polyester prior to the formation of the polyester film, eg by injection during extrusion. The optical brightener is preferably added in amounts in the range from 50 to 1500 ppm, more preferably 100 to 1000 ppm, and especially 200 to 300 ppm by weight, relative to the weight of the outer layer polyester. Suitable optical brighteners include those available commercially under the trade names "Uvitex" MES, "Uvitex" OB, "Leucopur" EGM and "Eastobrite" OB-1.

The components of the opaque core layer and/or white outer layer compositions may be mixed together in conventional manner. For example, by mixing with the monomeric reactants from which the polyester is derived, or the components may be mixed with the polyester by tumble or dry blending or by compounding in an extruder, followed by cooling and, usually, comminution into granules or chips. Alternatively, masterbatching technology may be employed.

The external surface of the white outer layers preferably exhibit an 60° gloss value, measured as herein described, in the range from 30% to 60%, more preferably 35% to 55%, particularly 40% to 50%, and especially 42% to 46%.

The external surface of the white outer layers preferably exhibit a root mean square surface roughness (Rq), measured as herein described, in the range from 100 to 1000 nm, more preferably 120 to 700 nm, particularly 130 to 600 nm, and especially 150 to 500 nm.

The thickness of the white outer layers is preferably in the range from 5 to 150 μm, more preferably 10 to 100 μm, particularly 15 to 50 μm, and especially 20 to 30 μm.

The polyester film according to the present invention preferably has the following CIE laboratory colour co-ordinate values for $L^*$, $a^*$ and $b^*$, measured as herein described. The $L^*$ value is preferably in the range from 90 to 100, more preferably 93 to 99, and particularly 96 to 98. The $a^*$ value is preferably in the range from −3 to 2, more preferably −2 to 1, particularly −1 to 0.5, and especially −0.8 to 0.2. The $b^*$ value is preferably in the range from −10 to 5, more preferably −5 to 3, particularly −3 to 1, and especially −2 to 0.

The polyester film preferably exhibits a whiteness index, measured as herein described, in the range from 80 to 120, more preferably 85 to 110, particularly 90 to 105, and especially 95 to 100 units.

The polyester film preferably exhibits a Transmission Optical Density (TOD), in the range from 2.5 to 10, more preferably 3.0 to 8.0, particularly 4.0 to 7.0, and especially 5.0 to 6.0.

The polyester film according to the present invention is a multilayer structure comprising, in order, white outer layer/opaque core layer/white outer layer. The two white outer layers may be different as regards chemical composition, thickness etc, but are suitably the same, ie a symmetrical structure is preferred. In a particularly preferred embodiment of the invention, the external surface of each of the two white outer layers are similar or substantially the same, by which is meant the difference in the 85° gloss value for the two surfaces is in the range from 0 to 3%, more preferably 0 to 2%, particularly 0 to 1%, and especially 0 to 0.5%. In addition, the difference in the whiteness index for the two surfaces is preferably in the range from 0 to 3, more preferably 0 to 2, particularly 0 to 1, and especially 0 to 0.5 units. Further, the difference in the root mean square surface roughness (Rq) value for the two surfaces is preferably in the range from 0 to 100 nm, more preferably 0 to 50 nm, particularly 0 to 20 nm, and especially 0 to 5 nm.

The overall thickness of the polyester film according to the invention is preferably in the range from 12 to 350 μm, more preferably 50 to 250 μm, particularly 100 to 200 μm, and especially 100 to 175 μm. The thickness of the opaque core layer is preferably in the range from 10% to 80%, more preferably 20% to 65%, particularly 30% to 60%, and especially 40% to 50% of the thickness of the polyester film.

A polyester film according to the invention may be coated on one or both surfaces with one or more additional coating, ink and/or lacquer layers, for example to form a coated film which exhibits improved properties, such as handleability, antistatic or adhesion promoting, compared with the uncoated film. Suitable coating materials include film-forming polymeric resins such as acrylic resins, copolyesters, styrene copolymers, acrylic copolymers, functionalised polyolefins, polyvinyl alcohol, polyallylamine, cellulosic materials such as nitrocellulose, ethylcellulose and hydroxyethylcellulose. Blends or mixtures of any of the aforementioned polymeric resins may be employed.

A particularly preferred coating layer comprises an acrylic copolymer comprising 35 to 60 mole % of ethyl acrylate/30 to 55 mole % of methyl methacrylate/2 to 20 mole % of methacrylamide, and especially comprising approximate molar proportions 46/46/8% respectively of ethyl acrylate/methyl methacrylate/acrylamide or methacrylamide, the latter polymer being particularly effective when thermoset, for example in the presence of about 25 weight % of a methylated melamine-formaldehyde resin.

Prior to the deposition of a coating medium onto the polyester film, the exposed surface thereof may, if desired, be subjected to a chemical or physical surface-modifying treatment to improve the bond between that surface and the subsequently applied coating layer. A preferred treatment is corona discharge. Alternatively, the surface of the polyester film may be pre-treated with an agent known in the art to have a solvent or swelling action thereon. For a polyester film, a suitable material includes a halogenated phenol dissolved in a common organic solvent, eg a solution of p-chloro-m-cresol, 2,4-dichlorophenol, 2,4,5- or 2,4,6-trichlorophenol or 4-chlororesorcinol in acetone or methanol.

The coating medium may be applied to an already oriented polyester film surface, but application of the coating medium is preferably effected before or during the stretching operation. In particular, it is preferred that the coating medium should be applied to the polyester film surface between the two stages (longitudinal and transverse) of a biaxial stretching operation.

The layers of a polyester film according to the invention may, if desired, contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated as appropriate.

The polyester film described herein can be used in a wide range of applications, particularly where high optical density is required. The polyester film is especially suitable for use in imaging applications such as photographic imaging, for writing on, in printing applications such as thermal and laser transfer printing, inkjet printing, lithographic printing including digital off-set lithographic printing, photocopying etc. A particularly preferred application is ink-jet printing. Any of the known ink-receiving layers may be applied to the surface of the polyester film according to the present invention, to form an inkable sheet suitable for ink-jet printing.

The aforementioned ink-receiving layers are well known in the art, and are generally hydrophilic, highly absorbent materials and may be formed from a wide range of polymeric materials, such as an acrylic, polyester, cellulosic resin, polyvinyl pyrrolidone, polyvinyl alcohol, or mixtures thereof.

The invention is illustrated by reference to the following drawings in which.

Figure 1:
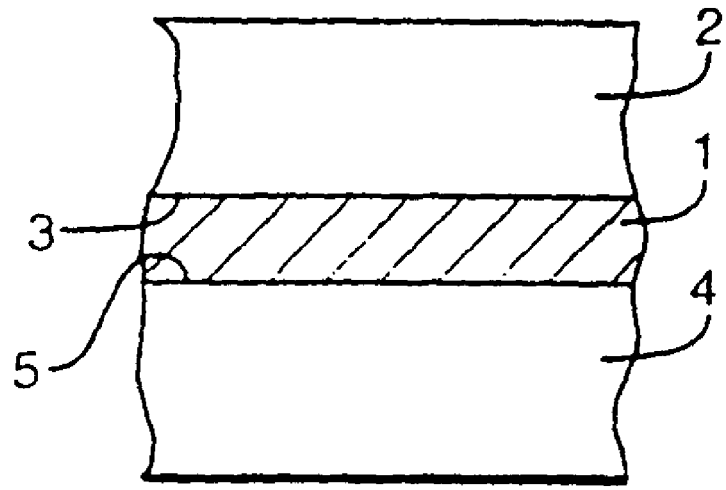
FIG. 1 is a schematic sectional elevation, not to scale, of a polyester film having an opaque core layer and two white outer layers.

Referring to FIG. 1 of the drawings, the polyester film comprises an opaque core layer (1) having a first white outer layer (2) bonded to a first surface (3) of the core layer, and a second white outer layer (4) on the second surface (5) of the core layer (1).

Figure 2:
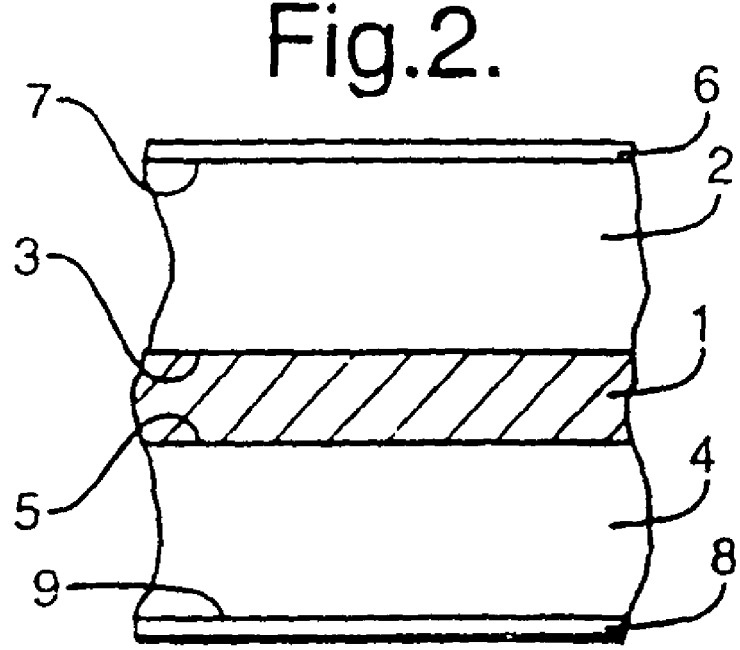
FIG. 2 is a similar schematic elevation of a film shown in FIG. 1, with adhesion promoting layers on the surface of each of the two white outer layers.

The film of FIG. 2 additionally comprises a first adhesion promoting layer (6) on the surface (7) of the first white outer layer (2) remote from the core layer (1), and a second adhesion promoting layer (8) on the surface (9) of the second white outer layer (4) remote from the core layer (1).

In this specification the following test methods have been used to determine certain properties of the polyester film:

(i) Transmission Optical Density (TOD) of the film was measured using a Macbeth Densitometer TR 927 (obtained from Dent and Woods Ltd, Basingstoke, UK) in transmission mode.

(ii) L*, a* and b* colour co-ordinate values (CIE (1976)) and whiteness index were measured using a Colorgard System 2000, Model/45 (manufactured by Pacific Scientific) based on the principles described in ASTM D 313.

(iii) 60° gloss value of the film surface was measured using a Dr Lange Reflectometer REFO 3 (obtained from Dr Bruno Lange, GmbH, Dusseldorf, Germany) according to DIN 67530.

(iv) The film surface root mean square roughness (Rq) was measured using a Wyko Optical Profiler over a field of view of 0.9×1.2 mm.

The invention is further illustrated by reference to the following examples.

EXAMPLE 1

Separate streams of (i) a core layer polymer of polyethylene terephthalate comprising 3% by weight, relative to the weight of polyethylene terephthalate, of Furnace type carbon black having a mean particle diameter of 23 nm and BET specific surface area of 150 $m^2 gm^{-1}$ (measured by multi-point nitrogen adsorption using a Micromeritics ASAP 2400 (Micromeritics Limited, Dunstable, UK)), and (ii) two outer layer polymers of polyethylene terephthalate comprising 15% by weight, relative to the weight of polyethylene terephthalate, of rutile titanium dioxide having a volume distributed median particle diameter of 0.7 μm, were supplied from separate extruders to a single channel coextrusion assembly. The polyester layers were extruded through a film-forming die onto a water cooled rotating, quenching drum to yield an amorphous cast composite extrudate. The cast extrudate was heated to a temperature of about 80° C. and then stretched longitudinally at a forward draw ratio of 2.9:1. The film was passed into a stenter oven, where the film was dried and stretched in the sideways direction to approximately 3.4 times its original dimensions. The biaxially stretched polyester film was heat set at a temperature of about 220° C. Final film thickness was 100 μm. The opaque core layer was 15 μm thick, and the two white outer layers were both 42.5 μm thick.

The polyester film was subjected to the test procedures described herein and exhibited the following properties:

(i) Transmission Optical Density (TOD)=4.1.

(ii) L*=94.06 (difference between the two white outer layer surfaces=0.3).
 a*=−1.65.
 b*=−0.43.
Whiteness Index=87.76 units (difference between the two white outer layer surfaces=0.91 units).

(iii) 60° gloss value=53.0% (difference, between the two white outer layer surfaces=0.1%).

(iv) Root mean square surface roughness (Rq)=175 nm (difference between the two white outer layer surfaces=7 nm).

The film was suitable for imaging on both surfaces thereof. The film was written on using a black marker pen, and the writing could not be seen through the other side of the film even when the film was held up to the window or to a bright artificial light, eg on an overhead projector.

EXAMPLE 2

The procedure of Example 1 was repeated except that the core layer comprised 2% of carbon black, and final film thickness was 175 μm, the opaque core layer being 18 μm thick, and the two white outer layers being both 78.5 μm thick.

The polyester film was subjected to the test procedures described herein and exhibited the following properties:

(i) Transmission Optical Density (TOD)=4.9.

(i) $L^*$=96.38 (difference between the two white outer layer surfaces=0.02).
  $a^*$=−1.50.
  $b^*$=−1.96.
  Whiteness Index=80.02 units (difference between the two white outer layer surfaces=0.97 units).

(iii) 60° gloss value=53.1% (difference between the two white outer layer surfaces=0.1%).

The film was also suitable for imaging on both surfaces thereof.

EXAMPLE 3

The procedure of Example 1 was repeated except that the core layer comprised 2% of carbon black, the white outer layers comprised 18% by weight, relative to the weight of polyethylene terephthalate, of barium sulphate having a volume distributed median particle diameter of 0.8 μm. The opaque core layer was 10 μm thick, and the two white outer layers were both 45 μm thick.

The polyester film was subjected to the test procedures described herein and exhibited the following properties:

(i) Transmission Optical Density (TOD)=2.6.

(ii) $L^*$=93.61 (difference between the two white outer layer surfaces=0.07).
  $a^*$=−0.27.
  $b^*$=−3.23.
  Whiteness Index=101.96 units (difference between the two white outer layer surfaces=0.04 units).

(iii) 60° gloss value=52.15% (difference between the two white outer layer surfaces=1.1%).

(iv) Root mean square surface roughness (Rq)=335 nm (difference between the two white outer layer surfaces=70 nm).

The film was also suitable for imaging on both surfaces thereof.

EXAMPLE 4

The procedure of Example 1 was repeated except that the core layer comprised 0.3% of carbon black and 16% of rutile titanium dioxide, and the two outer layers comprised 20% of rutile titanium dioxide. The final film thickness was 100 μm, the opaque core layer being 50 μm thick, and the two white outer layers being both 25 μm thick.

The polyester film was subjected to the test procedures described herein and exhibited the following properties:

(i) Transmission Optical Density (TOD)=6.2.

(ii) $L^*$=95.85.
  $a^*$=−0.70.
  $b^*$=−1.80.
  Whiteness Index=99.80 units.

(iii) 60° gloss value=43.6%

(iv) Root mean square surface roughness (Rq)=257 nm.

The film was also suitable for imaging on both surfaces thereof.

EXAMPLE 5

The procedure of Example 4 was repeated except that the final film thickness was 175 μm, the opaque core layer being 87.5 μm thick, and the two white outer layers being both 43.8 μm thick.

The polyester film was subjected to the test procedures described herein and exhibited the following properties:

(i) Transmission Optical Density (TOD)=6.5.

(ii) $L^*$=97.12.
  $a^*$=−0.57.
  $b^*$=−1.04.
  Whiteness Index 98.66 units.

(iii) 60* gloss value=49.0%

The film was also suitable for imaging on both surfaces thereof.

EXAMPLE 6

The procedure of Example 1 was repeated except that the core layer comprised 0.25% of carbon black, and the two outer layers comprised 15% of anatase titanium dioxide. The final film thickness was 100 μm, the opaque core layer being 50 μm thick, and the two white outer layers being both 25 μm thick.

The polyester film was subjected to the test procedures described herein and exhibited the following properties:

(i) Transmission Optical Density (TOD)=5.55.

(ii) $L^*$=87.74.
  $a^*$=−1.00.
  $b^*$=−6.97.
  Whiteness Index=106.29 units.

(iii) 60° gloss value=47.5%

The film was also suitable for imaging on both surfaces thereof.

EXAMPLE 7

The procedure of Example 1 was repeated except that the core layer comprised 0.2% of carbon black and 12.5% of rutile titanium dioxide, and the two outer layers comprised 15% of rutile titanium dioxide and 1000 ppm of optical brightener. The final film thickness was 100 μm, the opaque core layer being 50 μm thick, and the two white outer layers being both 25 μm thick.

The polyester film was subjected to the test procedures described herein and exhibited the following properties:

(i) Transmission Optical Density (TOD)=5.03.

(ii) $L^*$=93.0.

a*=−0.60.
b*=−3.70.
Whiteness Index=103.00 units.

(iii) 60° gloss value=41.7%

The film was also suitable for imaging on both surfaces thereof.

EXAMPLE 8

The procedure of Example 7 was repeated except that the two outer layers comprised no optical brightener.

The polyester film was subjected to the test procedures described herein and exhibited the following properties:

(i) Transmission Optical Density (TOD)=5.03.

(ii) L*=93.8.
a*=−1.10.
b*=−1.80.
Whiteness Index=94.6 units.

The film was also suitable for imaging on both surfaces thereof.

EXAMPLE 9

This is a Comparative Example not according to the invention. A polyethylene terephthalate monofilm comprising 18% by weight, relative to the weight of polyethylene terephthalate, of barium sulphate was produced according to the general film making procedures described in Example 1. The final film thickness was 100 μm.

The polyester film was subjected to the test procedures described herein and exhibited the following properties:

(i) Transmission Optical Density (TOD)=1.05.

(ii) L*=96.90.
a*=0.28.
b*=−1.08.
Whiteness Index=98.34 units.

(iii) 60° gloss value=43.9%

The film was unsuitable for imaging on both sides. An image applied on one side of the film with a black marker pen, could be seen through the other side of the film when the film was held up to the light.

The invention claimed is:

1. A white composite polymeric film having a thickness in the range of 12 to 350 μm, said composite film comprising:
   (i) an oriented opaque polyester core layer having a first and a second surface and a transmission optical density greater than 2.0;
   (ii) an oriented white polyester outer layer on each of said first and second surfaces; and
   (iii) an inkjet ink receptive layer on an outer surface of each of said white polyester outer layers,
   wherein said film thickness and ink receptivity are selected for use with an inkjet printer,
   wherein said transmission optical density is selected to prevent visible optical print-through of ink indicia printed on one side thereof from an opposite side, and
   wherein the core layer exhibits a CIE laboratory color coordinate L* value in the range from 10 to 60.

2. A white composite polymeric film having a thickness in the range of 12 to 350 μm, said composite film comprising:
   (i) an oriented opaque polyester core layer having a first and a second surface and a transmission optical density greater than 2.0;
   (ii) an oriented white polyester outer layer on and in direct contact with each of said first and second surfaces; and
   (iii) an inkjet ink receptive layer on an outer surface of each of said white polyester outer layers,
   wherein said film thickness and ink receptivity are selected for use with an inkjet printer and
   wherein said transmission optical density is selected to prevent visible optical print-through of ink indicia printed on one side thereof from an opposite side.

3. The film of claim 2, wherein each of said outer layers comprises a whitening agent in a range from 15% to 25% by weight, based on the weight of the outer layer polyester.

4. The film of claim 3 wherein the whitening agent comprises barium sulphate.

5. The film according to claim 2 wherein the transmission optical density of said core layer is in a range from 2.5 to 10.

6. The film according to claim 2 wherein the transmission optical density of said core layer is in a range is in a range from 3.0 to 7.0.

7. The film according to claim 2 wherein the core layer comprises an opacifying agent in the range from 0.05% to 10% by weight based on the weight of the core layer polyester.

8. The film according to claim 7 wherein the opacifying agent comprises carbon black.

9. The film according to claim 2 wherein the core layer comprises a whitening agent.

10. The film of claim 9 wherein the whitening agent comprises barium sulphate.

11. The film according to claim 2 wherein each of said outer layers comprises a whitening agent in the range from 5% to 30% by weight, based on the weight of the outer layer polyester.

12. The film according to claim 11 wherein the same whitening agent is present in both the core layer and the outer layers.

13. The film of claim 12 wherein said outer layers exhibit a whiteness index and any difference in the whiteness index for the two outer layers is in the range from 0 to 3%.

14. The film of claim 11 wherein the whitening agent comprises barium sulphate.

15. The film of claim 2 wherein the thickness of the core layer is in the range from 10% to 80% of the thickness of the film.

16. The film of claim 2 wherein the thickness of the core layer is in the range from 20% to 65% of the thickness of the film.

17. The film of claim 2 wherein the outer layers each have a transmission optical density in a range from 0.4 to 1.75.

18. The film of claim 2 wherein the outer layers each have a transmission optical density in a range from 0.6 to 1.0.

* * * * *

UNITED STATES PATENT AND TRADEMARK OFFICE
CERTIFICATE OF CORRECTION

| | | |
|---|---|---|
| PATENT NO. | : 7,807,240 B2 | Page 1 of 1 |
| APPLICATION NO. | : 11/513884 | |
| DATED | : October 5, 2010 | |
| INVENTOR(S) | : John Francis and Philip Mark Rutter | |

It is certified that error appears in the above-identified patent and that said Letters Patent is hereby corrected as shown below:

Col. 12, Line 25 in Claim 6, after the word "layer," please delete, "is in a range".

Signed and Sealed this
Fourth Day of October, 2011

David J. Kappos
*Director of the United States Patent and Trademark Office*